United States Patent
Chang

(10) Patent No.: US 11,646,882 B2
(45) Date of Patent: May 9, 2023

(54) APPARATUS AND METHOD FOR GENERATING SECURITY KEY IN WIRELESS COMMUNICATION SYSTEM

(71) Applicant: Samsung Electronics Co., Ltd., Suwon-si (KR)

(72) Inventor: Sanghyun Chang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 195 days.

(21) Appl. No.: 16/488,154

(22) PCT Filed: Feb. 20, 2018

(86) PCT No.: PCT/KR2018/002076
§ 371 (c)(1),
(2) Date: Aug. 22, 2019

(87) PCT Pub. No.: WO2018/155884
PCT Pub. Date: Aug. 30, 2018

(65) Prior Publication Data
US 2020/0044840 A1   Feb. 6, 2020

(30) Foreign Application Priority Data
Feb. 24, 2017   (KR) .................. 10-2017-0024669

(51) Int. Cl.
*H04L 9/08* (2006.01)
*H04W 12/041* (2021.01)

(52) U.S. Cl.
CPC .......... *H04L 9/0875* (2013.01); *H04L 9/0822* (2013.01); *H04L 9/0891* (2013.01); *H04W 12/041* (2021.01)

(58) Field of Classification Search
CPC ... H04L 9/0875; H04L 9/0822; H04L 9/0891; H04L 2209/80; H04W 12/041
See application file for complete search history.

(56) References Cited

U.S. PATENT DOCUMENTS 9,465,582 B1 * 10/2016  Whelan ................. H04L 9/3297
10,129,022 B1 * 11/2018  Al Faruque ......... H04L 63/0435
(Continued)

FOREIGN PATENT DOCUMENTS

CN    105553649 A    5/2016
CN    106102052 A    11/2016
(Continued)

OTHER PUBLICATIONS

"Wang et al., Survey on channel reciprocity based key establishment techniques for wireless systems, 2015, Wireless Networks, pp. 1-13" (Year: 2015).*

(Continued)

*Primary Examiner* — Saleh Najjar
*Assistant Examiner* — Nhan Huu Nguyen
(74) *Attorney, Agent, or Firm* — Jefferson IP Law, LLP

(57) ABSTRACT

The present disclosure relates to a fifth generation (5G) or a pre-5G communication system for supporting higher data transmission rate compared to fourth generation (4G) communication systems such as Long Term Evolution (LTE). The present disclosure relates to generating a security key in a wireless communication system, and a method for operating a transmission end comprises the steps of: generating an encryption key using information related to channel estimation; and transmitting encrypted data to a receiving end using the encryption key.

6 Claims, 17 Drawing Sheets

(56) References Cited

U.S. PATENT DOCUMENTS

| | | | | |
|---|---|---|---|---|
| 2003/0199283 A1* | 10/2003 | Busch | H04W 52/12 | 455/509 |
| 2005/0015597 A1* | 1/2005 | Higurashi | H04L 9/0844 | 713/171 |
| 2007/0036353 A1* | 2/2007 | Reznik | H04L 63/1466 | 380/30 |
| 2007/0058808 A1* | 3/2007 | Rudolf | H04L 9/0891 | 380/44 |
| 2007/0165845 A1* | 7/2007 | Ye | H04W 12/50 | 380/30 |
| 2008/0057934 A1* | 3/2008 | Sung | H04W 72/082 | 455/422.1 |
| 2008/0090572 A1* | 4/2008 | Cha | H04L 63/068 | 455/436 |
| 2008/0100889 A1* | 5/2008 | Knittel | G11B 7/0053 | 359/2 |
| 2008/0123851 A1* | 5/2008 | Guccione | H04L 63/083 | 380/270 |
| 2008/0130887 A1* | 6/2008 | Harvey | H04B 10/85 | 380/256 |
| 2008/0144580 A1* | 6/2008 | Su | H04W 48/16 | 370/332 |
| 2009/0141900 A1* | 6/2009 | Ye | H04L 9/0875 | 380/270 |
| 2010/0067701 A1* | 3/2010 | Patwari | H04L 9/0875 | 380/279 |
| 2011/0280397 A1* | 11/2011 | Patwar | H04W 12/04 | 380/44 |
| 2012/0177201 A1* | 7/2012 | Ayling | H04L 9/0858 | 380/278 |
| 2013/0095846 A1* | 4/2013 | Brisebois | H04W 8/22 | 455/456.1 |
| 2013/0156181 A1* | 6/2013 | Baek | H04L 9/0875 | 380/44 |
| 2013/0163752 A1* | 6/2013 | Baek | H04L 63/065 | 380/44 |
| 2013/0208894 A1* | 8/2013 | Bovino | H04L 9/0852 | 380/278 |
| 2014/0171073 A1* | 6/2014 | Kim | H04W 56/00 | 455/434 |
| 2014/0219449 A1* | 8/2014 | Shattil | H04W 16/14 | 380/270 |
| 2014/0359272 A1* | 12/2014 | Hiltunen | H04W 12/50 | 713/150 |
| 2015/0023503 A1* | 1/2015 | Baek | H04W 12/041 | 380/270 |
| 2015/0048977 A1* | 2/2015 | Khandani | H01Q 19/108 | 343/837 |
| 2015/0063568 A1* | 3/2015 | Singhal | H04L 63/0428 | 380/270 |
| 2015/0172948 A1* | 6/2015 | Weber | H04W 72/0446 | 370/252 |
| 2015/0208263 A1* | 7/2015 | Behravan | H04L 5/0057 | 370/252 |
| 2016/0112189 A1* | 4/2016 | Tomaru | H04L 9/06 | 380/268 |
| 2016/0134352 A1* | 5/2016 | Stirling-Gallacher | H04B 7/0639 | 370/329 |
| 2016/0205501 A1 | 7/2016 | Lee et al. | | |
| 2016/0211577 A1* | 7/2016 | Miller | H04K 3/43 | |
| 2016/0337122 A1* | 11/2016 | Kwak | H04L 9/0875 | |
| 2017/0012772 A1* | 1/2017 | Mueller | H04L 43/0876 | |
| 2017/0026095 A1* | 1/2017 | Ashrafi | H04B 7/10 | |
| 2017/0338956 A1* | 11/2017 | Badawy | H04W 12/033 | |
| 2017/0373740 A1* | 12/2017 | Guo | H04B 7/0634 | |
| 2018/0013559 A1* | 1/2018 | Hassan | H04L 9/0875 | |
| 2018/0115420 A1* | 4/2018 | Ludwig | H04L 9/0875 | |
| 2019/0020473 A1* | 1/2019 | Molière et al. | H04B 17/391 | |

FOREIGN PATENT DOCUMENTS

| | | |
|---|---|---|
| KR | 10-2011-0076992 A | 7/2011 |
| KR | 10-1269026 B1 | 5/2013 |
| KR | 10-1269502 B1 | 5/2013 |
| KR | 10-1446629 B1 | 10/2014 |
| WO | 2015/030520 A1 | 3/2015 |

OTHER PUBLICATIONS

"Badawy et al., Secret Key Generation Based on AoA Estimation for Low SNR Conditions, May 2015, 2015 IEEE 81st Vehicular Technology Conference (VTC), pp. 1-7" (Year: 2015).*

"Huang et al., Fast Secret Key Generation in Static Wireless Networks: A Virtual Channel Approach, 2013, IEEE, pp. 2292-2300" (Year: 2013).*

"Badawy et al., Secret Key Generation based on AoA Estimation for Low SNR Conditions, 2015, IEEE, pp. 1-7" (Year: 2015).*

"Patwari et al., High-Rate Uncorrelated Bit Extraction for Shared Secret Key Generation from Channel Measurements, Jan. 2010, IEEE Transactions on Mobile Computing, vol. 9, pp. 17-29" (Year: 2010).*

Neal Patwari et al., High-Rate Uncorrelated Bit Extraction for Shared Secret Key Generation from Channel Measurements, IEEE Transactions on Mobile Computing, vol. 9, No. 1, Jan. 1, 2010, pp. 17-30, XP055268728.

European Search Report dated Dec. 18, 2019, European Application No. 18756614.6.

European Office Action dated Mar. 11, 2021, issued in a counterpart European Application No. 18 756 614.6-1218.

Badawy Ahmed et al: "Secret Key Generation Based on AoA Estimation for Low SNR Conditions", 2015 IEEE 81st Vehicular Technology Conference (VTC Spring), IEEE, May 11, 2015 pp. 1-7, XP033167536.

Pengfei Huang et al: "Fast secret key generation in static wireless networks: A virtual channel approach", INFOCOM, 2013 Proceedings IEEE, IEEE, Apr. 14, 2013, pp. 2292-2300, XP032440992.

Ohira T: "Secret Key Generation Exploiting Antenna Beam Steering and Wave Propagation Reciprocity", 2005 European Microwave Conference CNIT LA Defense, Paris, France, Piscataway, NJ, USA, IEEE, vol. 1, Oct. 4, 2005, pp. 9-12, XP010903301.

Aono T et al: "Wireless secret key generation exploiting reactancedomain scalar response of multipath fading channels", IEEE Trans. on Antennas and Propagation, IEEE Service Center, Piscataway, NJ, US, vol. 53, No. 11, Nov. 1, 2005, pp. 3776-3784, XP001512766.

Indian Office Action dated Jan. 14, 2022, issued in a counterpart Indian Application No. 201947036333.

Chinese Office Action dated Feb. 9, 2022, issued in a counterpart Chinese Application No. 201880013569.8.

European Office Action dated Jan. 24, 2023, issued in European Patent Application No. 18756614.6.

* cited by examiner

APPARATUS AND METHOD FOR GENERATING SECURITY KEY IN WIRELESS COMMUNICATION SYSTEM

TECHNICAL FIELD

The present disclosure generally relates to wireless communication, and more specifically, an apparatus and a method for generating a secure key.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Data transmitted or received in a wireless environment may be encrypted to enhance security. For such encryption, an encryption key is required. In general, the encryption key may be determined based on a public key or a shared key exchanged by signaling between two devices which perform communication. At this time, if the public key is exchanged over a radio channel, there is a risk of leakage to a third party. Hence, a key generation scheme having more robust security is demanded.

DISCLOSURE OF INVENTION

Technical Problem

Based on the discussions as stated above, various embodiments of the present disclosure provide an apparatus and a method for generating a more robust secure key in a wireless communication system.

In addition, various embodiments of the present disclosure may provide an apparatus and a method for generating a secure key using information relating to channel measurement in a wireless communication system.

In addition, various embodiments of the present disclosure may provide an apparatus and a method for generating a secure key using information relating to beam measurement results in a wireless communication system.

In addition, various embodiments of the present disclosure may provide an apparatus and a method for using a secure key generated based on channel reciprocity in a wireless communication system.

Solution to Problem

According to various embodiments of the present disclosure, a method for operating a transmitting node in a wireless communication system includes generating an encryption key using channel measurement related information, and transmitting, to a receiving node, data encrypted using the encryption key.

According to various embodiments of the present disclosure, a method for operating a receiving node in a wireless communication system includes generating a decryption key using channel measurement related information, and receiving, from a transmitting node, data encrypted using an encryption key corresponding to the decryption key.

According to various embodiments of the present disclosure, an apparatus for a transmitting node in a wireless communication system includes a controller for generating an encryption key using channel measurement related information, and a communication unit for transmitting, to a receiving node, data encrypted using the encryption key.

According to various embodiments of the present disclosure, an apparatus for a receiving node in a wireless communication system includes a controller for generating a decryption key using channel measurement related information, and a communication unit for receiving, from a transmitting node, data encrypted using an encryption key corresponding to the decryption key.

Advantageous Effects of Invention

Various embodiments of the present disclosure may provide more enhanced security, by generating a secure key based on channel related information.

Effects obtainable from the present disclosure are not limited to the above mentioned effects, and other effects which are not mentioned may be clearly understood by those skilled in the art of the present disclosure through the following descriptions.

BEST MODE FOR CARRYING OUT THE INVENTION

Figure 1:
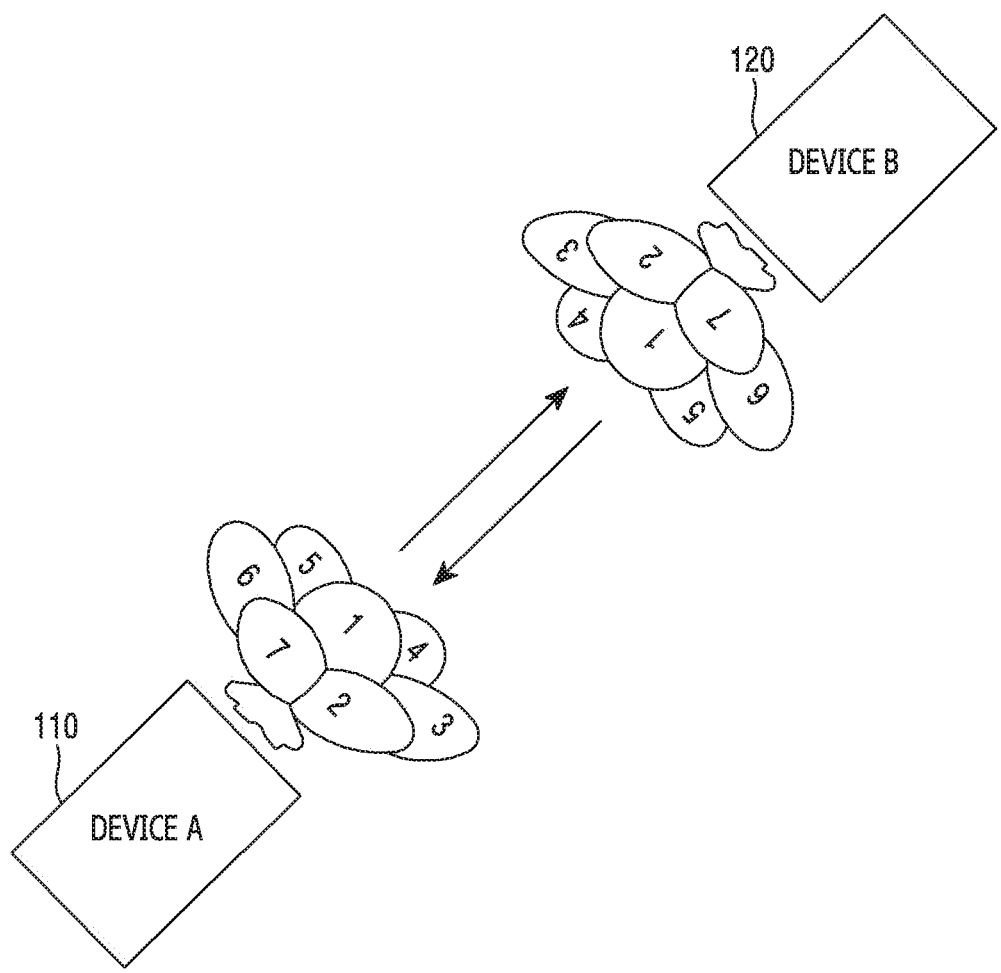
FIG. 1 illustrates a wireless communication system according to various embodiments of the present disclosure.

Terms used in the present disclosure are used for describing particular embodiments, and are not intended to limit the scope of other embodiments. A singular form may include a plurality of forms unless it is explicitly differently represented. All the terms used herein, including technical and scientific terms, may have the same meanings as terms generally understood by those skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even terms defined in this disclosure should not be interpreted to exclude the embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereafter, various embodiments of the present disclosure relate to an apparatus and a method for generating a secure key based on channel related information in a wireless communication system. Specifically, the present disclosure describes a technique for generating the secure key based on channel related information in the wireless communication system.

Terms indicating signals, terms indicating channels, terms indicating outcomes of measurement, terms indicating control information, terms indicating network entities, and terms indicating components of an apparatus, which are used in the following descriptions, are for the sake of explanations. Accordingly, the present disclosure is not limited to the terms to be described, and may use other terms having technically identical meaning.

Also, the present disclosure provides various embodiments by use of terms used in some communication standards (e.g., long term evolution (LTE) system and LTE-advanced (LTE-A)), which are merely exemplary. Various embodiments of the present disclosure may be easily modified and applied in other communication systems.

Wireless communication may provide a user with higher convenience than wired communication in terms of mobility. However, since a signal transmitted or received in the wireless communication system is transmitted from the device to another device over a wireless air, it may be vulnerable in terms of security. To overcome such a weak point, a secure key may be used. Herein, the secure key includes an encryption key for encryption and a decryption key for decryption. Specifically, before transmitting the signal to another device, a transmitting node may encrypt the signal to transmit using the secure key, that is, the encryption key. In addition, a receiving node receiving the encrypted signal may decrypt the encrypted signal using the decryption key corresponding to the encryption key.

The secure key such as the encryption key and the decryption key is generated directly in the devices, rather than be transmitting over a wireless link between the devices, to maintain the security. However, since the decryption key needs to correspond to the encryption key, that is, needs to be paired, the transmitting node and the receiving node may mostly exchange a public key for generating the secure key over the wireless link.

However, if the public key is leaked to a non-intended third party, the transmission data may be transmitted with distortion, or the data may be leaked. Accordingly, various embodiments of the present disclosure provide a solution for eliminate this risk.

FIG. 1 illustrates a wireless communication system according to various embodiments of the present disclosure.

Referring to FIG. 1, the wireless communication system may include a deviceA 110 and a deviceB 120. Herein, one of the deviceA 110 and the deviceB 120 may operate as the transmitting node, and the other may operate as the receiving node. However, the distinction between the transmitting node and the receiving node are relatively concepts, and may change according to an operation state.

The deviceA 110 or the deviceB 120 may transmit and receive data. According to one embodiment, the deviceA 110 or the deviceB 120 may perform beamforming. That is, the deviceA 110 or the deviceB 120 may improve a transmit gain by using transmit beamforming. In addition, the deviceA 110 or the deviceA 120 may improve a receive gain through receive beamforming. For example, the deviceA 110 or the deviceB 120 may transmit or receive a signal over a millimeter wave (mmWave) band (e.g., 28 GHz, 30 GHz, 38 GHz, 60 GHz) through at least one transmit beam. In addition, according to one embodiment, at least one of the deviceA 110 or the deviceB 120 may not include a universal subscriber identity module (USIM).

According to one embodiment, at least one of the device A 110 and the deviceB 120 may be the device having mobility. The device A 110 or the deviceB 120 may be a mobile phone, a smart phone, a music player, a potable game console, a navigation system, a laptop computer, and so on. In this case, the device A 110 or the deviceB 120 may be referred to as a terminal, a user equipment (UE), a mobile station, a subscriber station, a remote terminal, a wireless terminal, or a userdevice, or other term having a technically equivalent meaning. In this case, according to one embodiment, the device A 110 and the deviceB 120 may perform device-to-device (D2D) communication.

According to another embodiment, at least one of the device A 110 and the deviceB 120 may be a fixed device (e.g., consumer premise equipment (CPE)). For example, at least one of the device A 110 and the deviceB 120 may support Internet of things (IoT) communication. Alternatively, at least one the device A 110 and the deviceB 120 may perform machine type communication (MTC).

According to yet another embodiment, at least one of the device A 110 and the deviceB 120 may be a node which constructs a wireless access network. For example, the device A 110 or the deviceB 120 may be an infrastructure for an access network such as a base station and an access point (AP). The device A 110 or the deviceB 120 may be referred to as, beside the base station, an AP, an eNodeB (eNB), a 5th generation node (5G node), a wireless point, a transmission/reception point (TRP), or other term having a technically equivalent meaning.

Figure 2:
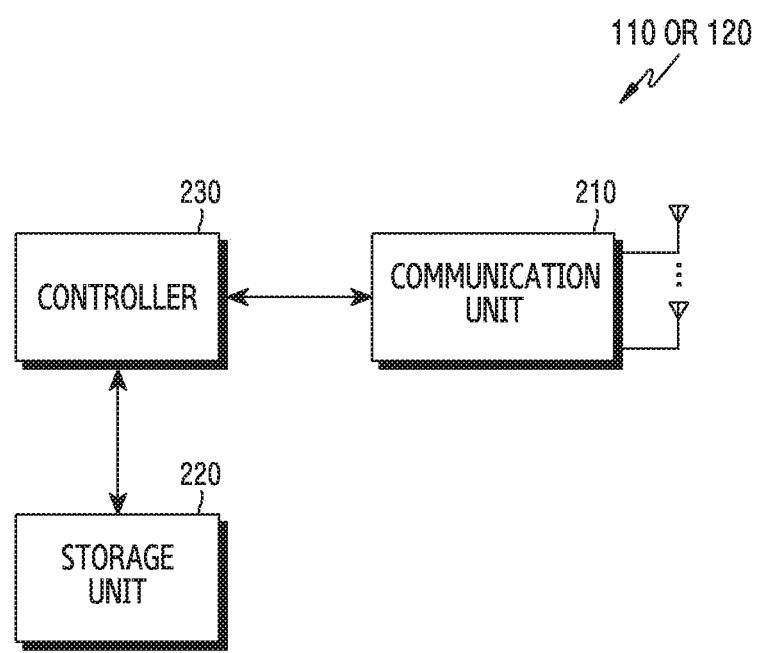
FIG. 2 illustrates a configuration of a device for performing communication in a wireless communication system according to various embodiments of the present disclosure.

FIG. 2 illustrates a configuration of a device for performing communication in a wireless communication system according to various embodiments of the present disclosure. FIG. 2 may be understood as the configuration of the deviceA 110 or the deviceB 120. A term such as 'portion' or '~er~' used hereafter indicates a unit for processing at least one function or operation, and may be implemented using hardware, software, or a combination of hardware and software.

Referring to FIG. 2, the device includes a communication unit 210, a storage unit 220, and a controller 230.

The communication unit 210 may perform functions for transmitting and receiving signals over a radio channel. For example, the communication unit 210 performs a conversion function between a baseband signal and a bit sequence according to a physical layer standard of the system. For example, in data transmission, the communication unit 210 generates complex symbols by encoding and modulating a transmit bit sequence. Also, in data reception, the communication unit 210 restores a receive bit sequence by demodulating and decoding a baseband signal. Also, the communication unit 210 up-converts the baseband signal to a radio frequency (RF) band signal, transmits it via an antenna, and down-converts an RF band signal received via the antenna to a baseband signal. For example, the communication unit 210 may include a transmit filter, a receive filter, an amplifier, a mixer, an oscillator, a digital to analog convertor (DAC), an analog to digital convertor (ADC), and so on.

In addition, the communication unit 210 may include a plurality of transmit and receive paths. Further, the communication unit 210 may include at least one antenna array including a plurality of antenna elements. In terms of the hardware, the wireless communication unit 210 may include a digital circuit and an analog circuit (e.g., radio frequency integrated circuit (RFIC)). In addition, the communication unit 210 may include a plurality of RF chains. Further, the communication unit 210 may perform beamforming.

The communication unit 210 transmits and receives the signals as stated above. Hence, the communication unit 210 may be referred to as a transmitter, a receiver, or a transceiver. Also, the transmission and the reception over the radio channel in the following descriptions are used as the meaning which embraces the above-stated processing of the communication unit 210.

The storage unit 220 stores a basic program for operating the device, an application program, and data such as setting information. The storage unit 220 may include a volatile memory, a non-volatile memory, or a combination of a volatile memory and a non-volatile memory. The storage unit 220 provides the stored data at a request of the controller 230.

The controller 230 controls general operations of the device. For example, the controller 230 transmits and receives signals through the communication unit 210. Also, the controller 230 records and reads data in and from the storage unit 220. For doing so, the controller 230 may include at least one processor or microprocessor, or may be part of the processor. In particular, according to various embodiments, the controller 230 may control the device to generate a secure key based on channel measurement related information. For example, the controller 230 may control the device to carry out operations to be explained according to various embodiments.

Figure 3A:
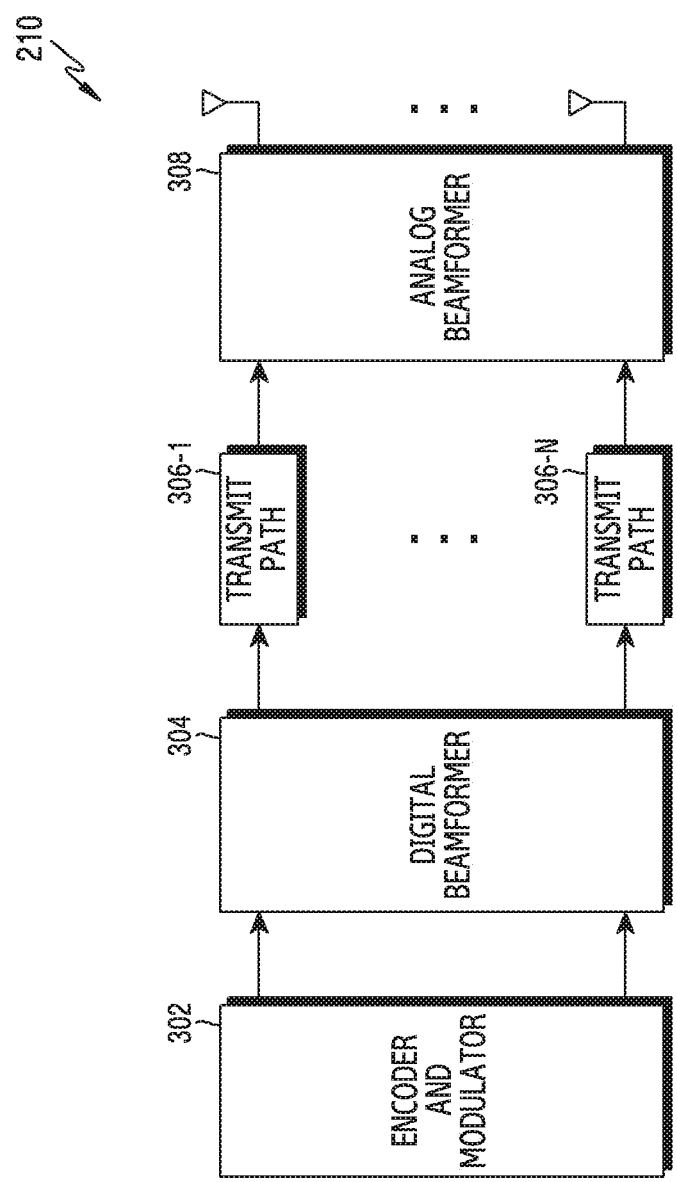
FIGS. 3A to 3C illustrate a configuration of a communication unit in a wireless communication system according to various embodiments of the present disclosure.
Figure 3B:
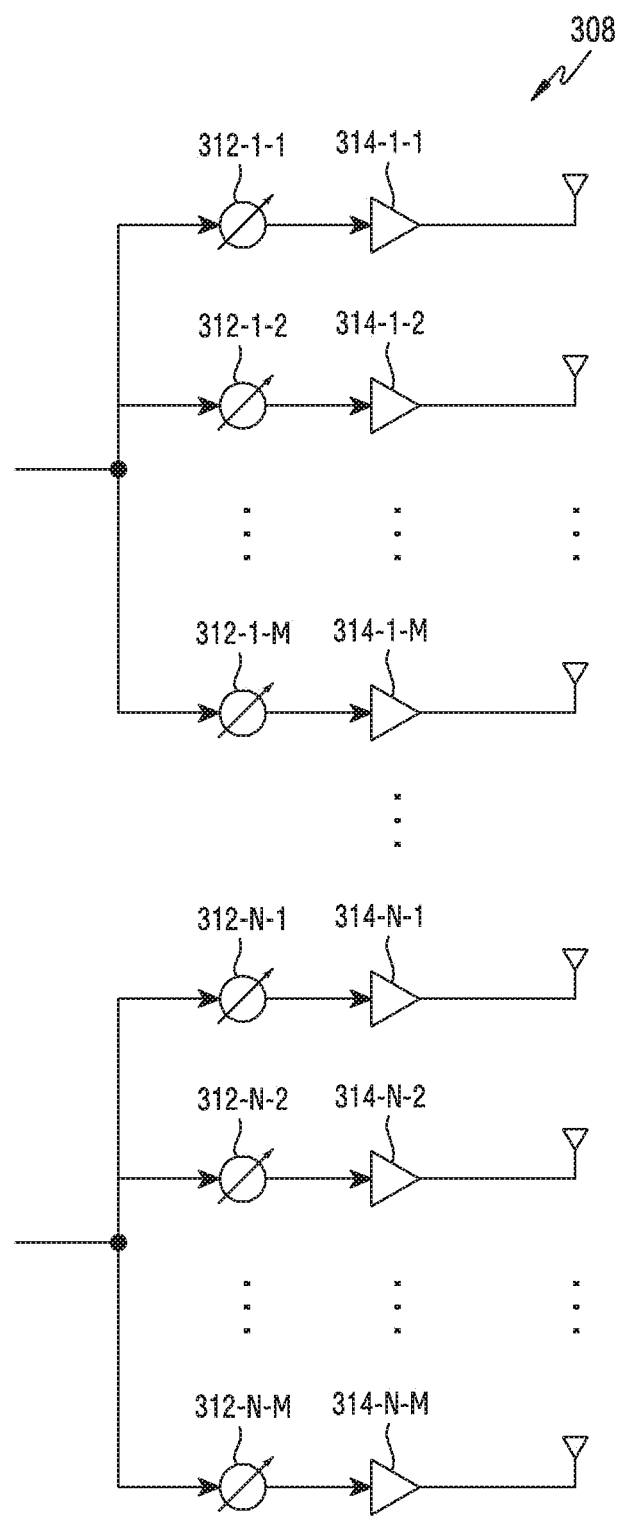
Figure 3C:
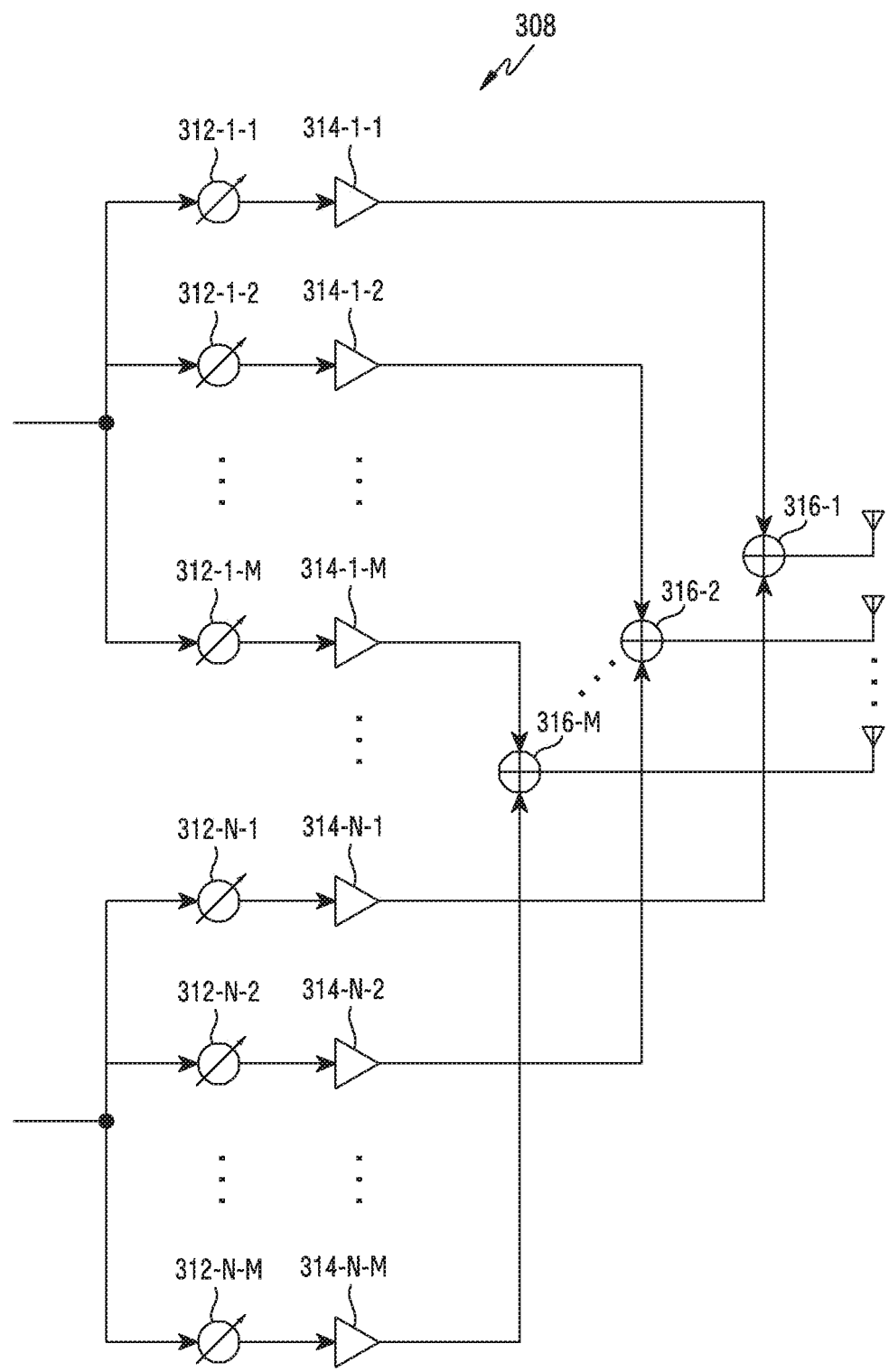

FIGS. 3A to 3C illustrate a configuration of a communication unit in a wireless communication system according to various embodiments of the present disclosure. FIGS. 3A to 3C depict an example of a detailed configuration of the communication unit 210 of FIG. 2. More specifically, FIGS. 3A to 3C depict components for performing the beamforming, as part of the communication unit 210 of FIG. 2.

Referring to FIG. 3A, the communication unit 210 or 310 includes an encoder and modulator 302, a digital beamformer 304, a plurality of transmit paths 306-1 to 306-N, and an analog beamformer 308.

The encoder and modulator 302 performs channel encoding. For the channel encoding, at least one of low density parity check (LDPC) code, convolution code, and polar code may be used. The encoder and modulator 302 generates modulation symbols by performing constellation mapping.

The digital beamformer 304 performs the beamforming on a digital signal (e.g., the modulation symbols). For doing so, the digital beamformer 304 multiplies the modulation symbols by beamforming weights. Herein, the beamforming weights are used to change an amplitude and a phase of the signal, and may be referred to as a precoding matrix, a precoder, and so on. The digital beamformer 304 outputs the digital-beamformed modulation symbols to the plurality of the transmit paths 306-1 to 306-N. In so doing, according to multiple input multipleoutput (MIMO) transmission, the modulation symbols may be multiplexed, or the same modulation symbols may be provided to the plurality of the transmit paths 306-1 to 306-N.

The plurality of the transmit paths 306-1 to 306-N convert the digital-beamformed digital signals to analog signals. For doing so, the plurality of the transmit paths 306-1 to 306-N each may include an inverse fast fourier transform (IFFT) operator, a cyclic prefix (CP) adder, a DAC, and an up-converter. The CP adder is used for an orthogonal frequency division multiplexing (OFDM) scheme, and may be excluded if other physical layer scheme (e.g., filter bank multi-carrier (FBMC)) is applied. That is, the plurality of the transmit paths 306-1 to 306-N provide an independent signal process for a plurality of streams generated by the digital beamforming. Notably, depending on the implementation, some of the components of the plurality of the transmit paths 306-1 to 306-N may be used in common.

The analog beamformer 308 performs the beamforming on the analog signal. For doing so, the digital beamformer 304 multiplies the analog signals by the beamforming weights. Herein, the beamforming weights are used to change the amplitude and the phase of the signal. More specifically, the analog beamformer 308 may be configured as shown in FIG. 3B or FIG. 3C, according to a connection structure between the plurality of the transmit paths 306-1 to 306-N and antennas.

Referring to FIG. 3B, signals inputted to the analog beamformer 308 are converted in phase/amplitude, amplified, and then transmitted via the antennas. In so doing, signals of each path are transmitted via different antenna sets, that is, via antenna arrays. As for signals inputted in a first path, the signals are converted by phase/amplitude converters 312-1-1 to 312-1-M to signal sequences having different or same phase/amplitude, amplified by amplifiers 314-1-1 to 314-1-M, and then transmitted via the antennas.

Referring to FIG. 3C, signals inputted to the analog beamformer 308 are converted in phase/amplitude, amplified, and then transmitted via the antennas. In so doing, the signals of each path are transmitted via the same antenna set, that is, via the same antenna array. As for the signals inputted in the first path, the signals are converted by the phase/magnitude converters 312-1-1 to 312-1-M to signal sequences having different or the same phase/amplitude, and amplified by the amplifiers 314-1-1 to 314-1-M. Next, to transmit via a single antenna array, the amplified signals are summed by adders 316-1-1 to 316-1-M based on the antenna element and then transmitted via the antennas.

FIG. 3B depicts the example where the independent antenna array is used per transmit path, and FIG. 3C depicts the example where the transmit paths share one antenna array. However, according to another embodiment, some transmit paths may use the independent antenna array, and the rest transmit paths may share one antenna array. Further, according to yet another embodiment, by applying a switchable structure between the transmit paths and the antenna arrays, a structure which adaptively changes according to a situation may be used.

Figure 4:
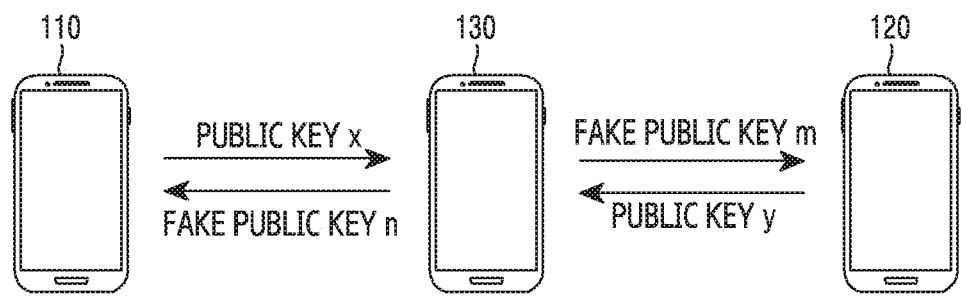
FIG. 4 illustrates an example of a scenario in which a public key is leaked in a wireless communication system.

If the devices perform the communication as described above, encryption may be conducted for data protection. In this case, if a key agreement scheme based on a public key and a private key is used, the secure key may be leaked. For example, an example of a scenario in which the secure key is leaked is shown in FIG. 4. FIG. 4 illustrates the example of the scenario in which the public key is leaked.

Referring to FIG. 4, the device A 110 may transmit a public key x of the device A 110 to the deviceB 120 so that the deviceB 120 may generate a decryption key corresponding to the encryption key of the deviceA 110. In addition, the deviceB 120 may transmit a public key y of the deviceB 120 to the device A 110 so that the deviceA 110 may generate an encryption key corresponding to the decryption key. The public key x and the public key y, since they are transmitted over a radio link between the device A 110 and deviceB 120, may be leaked to a non-intended third device.

For example, in a wireless communication system 120, a non-intended device 130 may intercept the public key x to be transmitted to the deviceB 120. The non-intended device 130 may transmit a fake public key m to the deviceB 120 instead of the public key x. The deviceB 120 may mistake the fake public key m received from the non-intended device 130 for the public key x. Due to such a mistake, the deviceB 120 may receive non-intended data such as hacking data from the non-intended device 130.

In another example, in the wireless communication system 120, the non-intended device 130 may intercept the public key y to be transmitted to the deviceA 110. The non-intended device 130 may transmit a fake public key n to the device A 110 instead of the public key y. The device A 110 may mistake the fake public key n received from the non-intended device 130 for the public key y. Due to this mistake, the non-intended device 130 may intercept the data to be transmitted to the deviceB 120.

As described above, the procedure for exchanging the public key may cause the non-intended device to intercept the data or to inject the non-intended data such as hacking data. Hence, the following disclosure describes various embodiments for further enhancing security, by generating the secret key based on a channel between the devices.

According to various embodiments, the device A 110 and the deviceB 120 each may generate a secure key based on channel related information between the device A 110 and the deviceB 120. Since the device A 110 and the deviceB 120 each generate the secure key based on the channel related information between the deviceA 110 and the deviceB 120, the procedure for exchanging the public key which is highly likely to be leaked to a non-intended device (or user) may not may performed.

Figure 5:
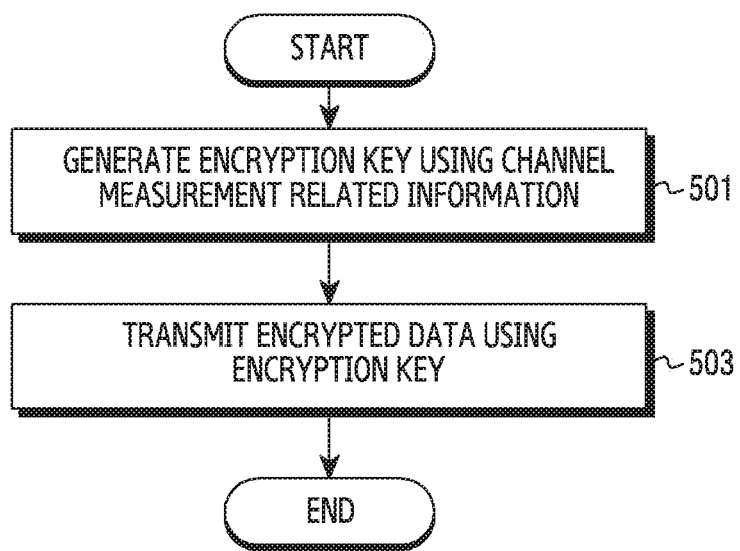
FIG. 5 illustrates an operating method of a device for transmitting data in a wireless communication system according to various embodiments of the present disclosure.

FIG. 5 illustrates an operating method of a device for transmitting data in a wireless communication system according to various embodiments of the present disclosure. FIG. 5 illustrates the operating method of the device for transmitting data, that is, for encrypting data, as the operating method of the device A 110 or the deviceB 120. In the following descriptions, the operating entity of FIG. 5 is referred to as a 'transmitting node'.

Referring to FIG. 5, in step 501, the transmitting node generates an encryption key using channel measurement related information. Herein, the channel measurement related information may be related to at least one of channel measurement results, resources used for the channel measurement, and a channel measurement procedure. For example, the channel measurement related information may be determined from measurement results of beams. Herein, the measurement results of beam pairs may be related to signal strength, channel impulse response (CIR), angle of arrival (AOA), time of arrival (TOA), number of multi-path or other metric associated with the signal measurement.

Next, in step 503, the transmitting node transmits the encrypted data using the encryption key. In other words, the transmitting node performs the encryption by substituting or modifying at least part of the data using the encryption key, and transmits the encrypted data over a wireless channel. At this time, the transmitting node may transmit the data using a transmit beam corresponding to a receive beam selected based on the measurement results of the beam pairs, or using a transmit beam selected based on separate beam measurement.

Figure 6:
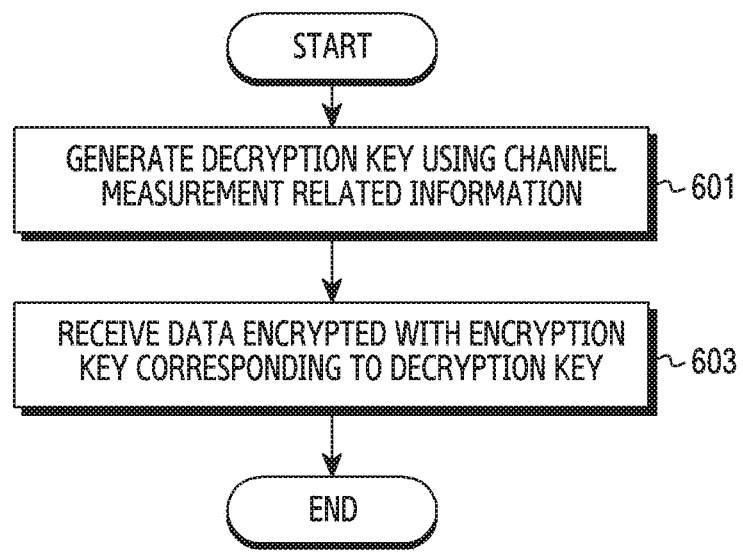
FIG. 6 illustrates an operating method of a device for receiving data in a wireless communication system according to various embodiments of the present disclosure.

FIG. 6 illustrates an operating method of the device for receiving data in a wireless communication system according to various embodiments of the present disclosure. FIG. 6 illustrates the operating method of the device for receiving data, that is, for decrypting data, as the operating method of the device A 110 or the deviceB 120. In the following descriptions, the operating entity of FIG. 6 is referred to as a 'receiving node'.

Referring to FIG. 6, in step 601, the receiving node generates a decryption key using channel measurement related information. Herein, the channel measurement related information may be related to at least one of channel measurement results, resources used for the channel measurement, and a channel measurement procedure. Herein, the channel measurement related information may be determined from measurement results of beams. Herein, the measurement results of beam pairs may be related to signal strength, CIR, AOA, TOA, number of multi-path or other metric associated with the signal measurement.

Next, in step 603, the receiving node receives data encrypted with an encryption key corresponding to the decryption key. Hence, although not depicted in FIG. 6, the receiving node may decrypt the encrypted data using the decryption key. In so doing, the receiving node may receive the data using a receive beam selected based on the measurement results of the beam pairs, or using a receive beam selected based on separate beam measurement.

As described in FIG. 5 and FIG. 6, the transmitting node and the receiving node generate the encryption key and the decryption key based on the channel measurement related information, specifically, information derived from the measurement results of the beam pairs. At this time, the encryption key and the decryption key are generated by different devices, but may correspond to each other. This is based on channel reciprocity indicating that a channel value measured at the transmitting node and a channel value measured at the receiving node are the same. However, although the channel reciprocity is not guaranteed, if at least one of the transmitting node and the receiving node admits substantial channel reciprocity by compensation of the channel value, various embodiments may be equally applied.

The measurement results of the beam pairs depend on the channel. Accordingly, if a channel between a third device and the transmitting node is different from the channel between the transmitting node and the receiving node, although the third device receives beamformed reference signals transmitted from the transmitting node, the third device may not obtain the same measurement result. Hence, in a general environment, the third device may not obtain the same measurement result. This is because the measurement results of the beam pairs depend on the channel, and the measurement result changes if the channel changes.

In addition, the measurement results of the beam pairs depend on an order of the beams used for beam sweeping. Thus, although the channels are similar because the third device is quite close to the receiving node, if the order of the beams used at the measuring device is unknown, the third device may not obtain the same measurement result. Hence, in one embodiment, the device may further reinforce the security, by changing the order of the beams on a periodic basis or on an event basis. Operations of the device for doing so are as follows.

Figure 7:
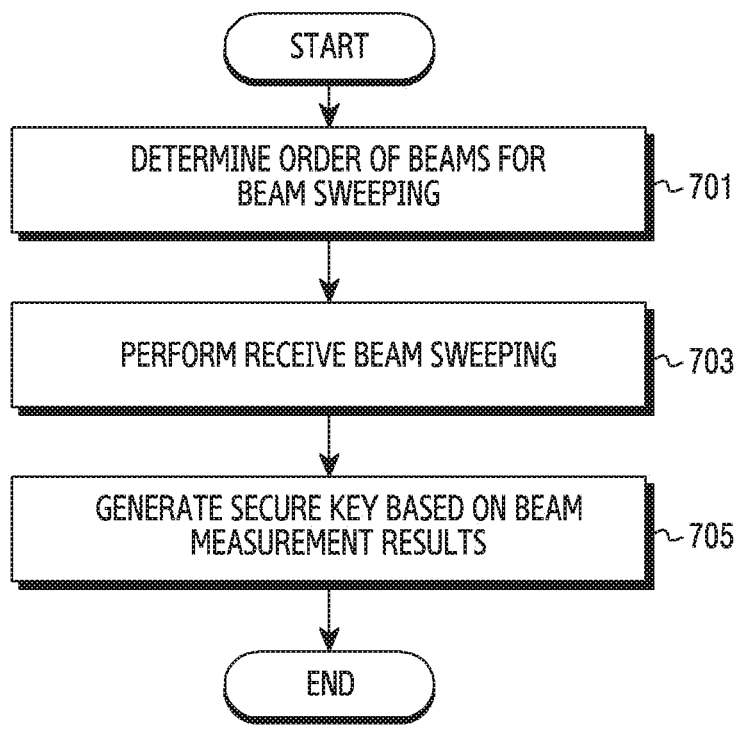
FIG. 7 illustrates an operating method for generating a secure key in a wireless communication system according to various embodiments of the present disclosure.

FIG. 7 illustrates an operating method for generating a secure key in a wireless communication system according to various embodiments of the present disclosure. FIG. 7 illustrates the operating method for generating an encryption key or a decryption key, as the operating method of the device A 110 or the deviceB 120. In the following descriptions, the operating entity of FIG. 7 is referred to as a 'device'.

Referring to FIG. 7, in step 701, the device determines an order of beams for beam sweeping. Before performing measurement on beam pairs, the device may determine in which order operable beams are swept. The order of the beams may be changed at a plurality of beam measurement intervals, or may be changed at two or more measurement intervals. Alternatively, the order of the beams may be changed if a predefined condition is satisfied.

Next, in step 703, the device performs receive beam sweeping. In other words, the device receives beamformed reference signals transmitted from other device through a plurality of receive beams. In so doing, the device changes the receive beams in the order determined in step 701. For example, the device may change a beam direction in sequence, at a specific interval, or at random.

In step 705, the device generates a secure key based on a beam measurement result. Herein, the secure key includes at least one of an encryption key or a decryption key. To generate the secure key, at least one value derived from the beam measurement result is used. For example, at least one value may be used as the secure key as it is, a seed value for generating the secure key, a value for modifying the secure key or part of them.

As explained with reference to FIG. 7, the device determines the order of the beams for the beam sweeping. Hence, the device may sweep the receive beams in a different order from the order used in a previous beam measurement interval. Thus, the security may be further enhanced.

Figure 8:
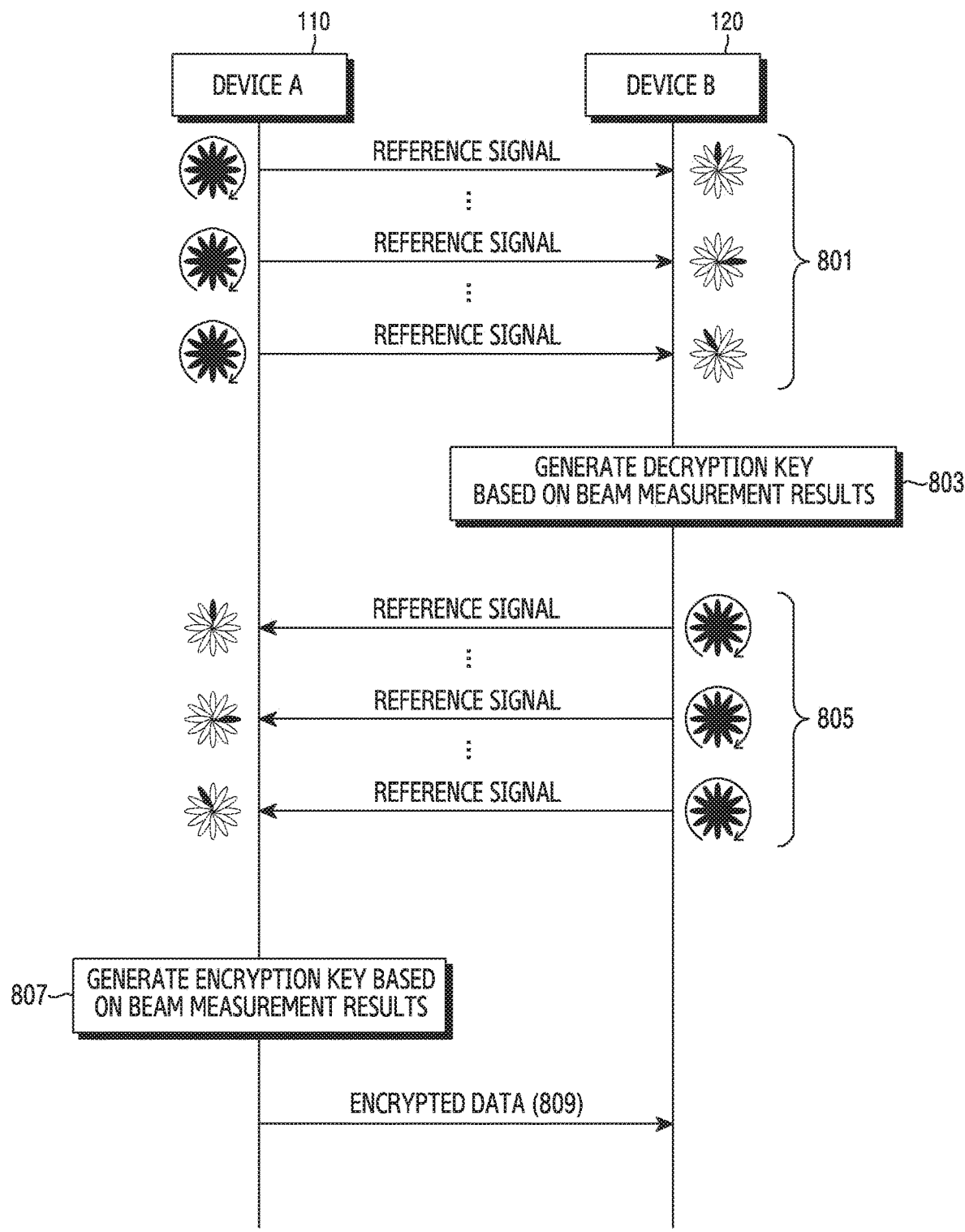
FIG. 8 illustrates signal exchanges for performing encrypted data communications in a wireless communication system according to various embodiments of the present disclosure.

FIG. 8 illustrates signal exchanges for performing encrypted data communications in a wireless communication system according to various embodiments of the present disclosure. FIG. 8 illustrates a situation where the deviceA 110 transmits data to the deviceB 120, as the signal exchange between the device A 110 and the deviceB 120.

Referring to FIG. 8, in step 801, the device A 110 transmits a plurality of reference signals to the deviceB 120. The reference signals are transmit-beamformed by the deviceA 110. That is, the device A 110 transmits the reference signals through transmit beam sweeping. In so doing, the deviceB 120 performs receive beam sweeping. Hence, the deviceB 120 may perform measurement on beam pairs.

In step 803, the deviceB 120 generates a decryption key based on a beam measurement result. Herein, the beam measurement result may include the signal strength, the CIR, the AOA, the TOA, the number of thye multi-path or other metric associated with the signal measurement.

Next, in step 805, the deviceB 120 transmits a plurality of reference signals to the deviceA 110. The reference signals are transmit-beamformed by the deviceB 120. That is, the deviceB 120 transmits the reference signals through the transmit beam sweeping. In so doing, the deviceB 120 may sweep the transmit beams in an order corresponding to the order used for the receive beam sweeping in the step 801. This is to maintain consistency of the measurement results of step 801 and step 805. The device A 110 may perform the receive beam sweeping, and perform the measurement on the beam pairs. Likewise, the device A 110 may sweep the receive beams in an order corresponding to the order used for the transmit beam sweeping in the step 801.

In step 807, the device A 110 generates an encryption key based on the beam measurement result. Herein, the beam measurement result may include the signal strength, the CIR, the AOA, the TOA, the number of the multi-path or other metric associated with the signal measurement. At this time, the device A 110 may generate the encryption key in the same manner as used by the deviceB 120 in step 803.

In step 809, the device A 110 transmits encrypted data. For doing so, the device A 110 encrypts data using the encryption key, and transmits over a radio channel. The deviceB 120 receives the encrypted data, and decrypts the encrypted data using the decryption key. In so doing, the device A 110 may use the transmit beam selected based on the measurement result of step 803 or step 805. In addition, the deviceB 120 may use the transmit beam selected based on the measurement result of step 803 or step 805. For doing so, although not depicted in FIG. 8, an operation of transmitting feedback information indicating an optimal beam from the device A 110 to the deviceB 120, or from the deviceB 120 to the device A 110 may be further conducted.

As mentioned above, the device according to various embodiments of the present disclosure may generate the secure key based on the channel measurement related information. In other words, since the device generates the secure key based on the channel related information without receiving the public key from the other device, the security may be further enhanced. In addition, since the device does not consume power for signaling to share the public key, power consumption caused by the calculation for generating the secret key may be reduced.

Also, as stated in FIG. 8, each device may generate the secure key after the beam measurement. Thus, if the secure key is determined at each beam measurement, every time the beam measurement is conducted, the secure key may be updated. That is, the period of the beam measurement and the update period of the secure key may coincide.

Figure 9:
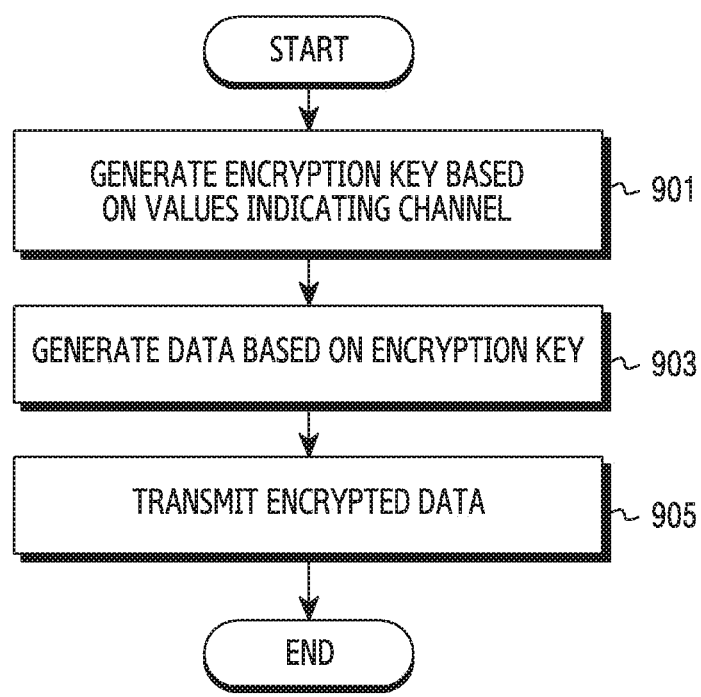
FIG. 9 illustrates an operating method of a device for generating an encryption key in a wireless communication system according to various embodiments of the present disclosure.

FIG. 9 illustrates an operating method of a device for generating an encryption key in a wireless communication system according to various embodiments of the present disclosure. FIG. 9 illustrates the operating method of the device for transmitting data, that is, for encrypting data, as the operating method of the deviceA 110 or the deviceB 120. In the following descriptions, the operating entity of FIG. 9 is referred to as a 'transmitting node'.

Referring to FIG. 9, in step 901, the transmitting node generates an encryption key based on a plurality of values for indicating a channel from the receiving node to the transmitting node. According to one embodiment, the plurality of the values for indicating the channel may be determined based on reference signals which are transmitted through a plurality of transmit beams of other device from the other device. According to one embodiment, the transmitting node may receive the reference signals over a plurality of receive beams. The plurality of the values for indicating the channel may be defined per a plurality of beam pairs respectively determined by combinations of the multiple receive beams of the transmitting node and the multiple transmit beams of the receiving node. For example, the plurality of the values may be CIR, and expressed by <Equation 1>.

$$\begin{pmatrix} h_{AB}^{11} \\ \vdots \\ h_{AB}^{N,M} \end{pmatrix} \quad \text{Equation 1}$$

In <Equation 1>, AB denotes the channel from the receiving node (e.g., the deviceA) to the transmitting node (e.g., the deviceB), ij (e.g., 11, ..., NM, etc) denotes a beam pair including a combination of an i-th transmit beam of the receiving node and a j-th receive beam of the transmitting node, and $h_{AB}^{ij}$ denotes the CIR for the beam pair including the combination of the i-th transmit beam of the receiving node and the j-th receive beam of the transmitting node in the channel from the receiving node to the transmitting node.

The transmitting node may generate the encryption key based on bit sequences generated by quantizing the plurality of the values as shown in <Equation 1>. According to one embodiment, the encryption key may be updated at reception intervals of the reference signal. According to another embodiment, the encryption key may be changed according to a predetermined rule based on the seed of the transmitting node.

In step 903, the transmitting node generates encrypted data by encrypting data to be transmitted based on the generated encryption key. Next, in step 905, the device transmits the encrypted data to the receiving node. Accordingly, the receiving node may receive the encrypted data.

Figure 10:
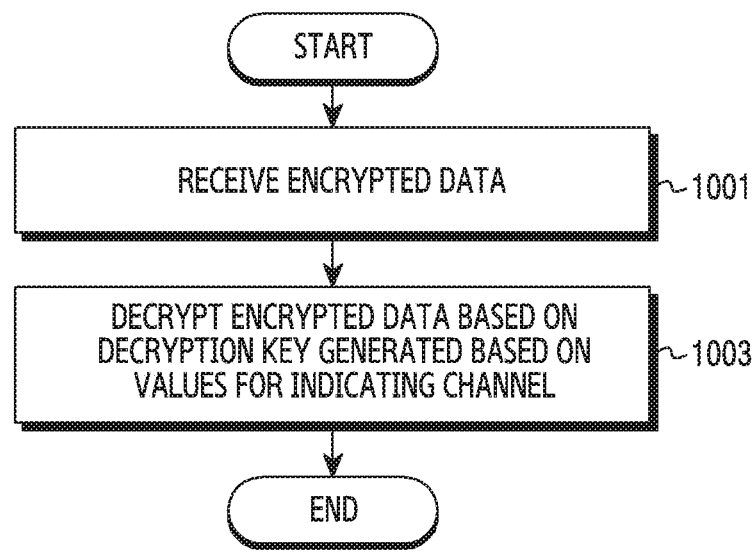
FIG. 10 illustrates an operating method of a device for generating a decryption key in a wireless communication system according to various embodiments of the present disclosure.

FIG. 10 illustrates an operating method of a device for generating a decryption key in a wireless communication system according to various embodiments of the present disclosure. FIG. 10 illustrates the operating method of the device for receiving data, that is, for decrypting data, as the operating method of the device A 110 or the deviceB 120. In the following descriptions, the operating entity of FIG. 6 is referred to as a 'receiving node'.

Referring to FIG. 10, in step 1001, the receiving node receives encrypted data from the transmitting node. The encrypted data may be data generated by the procedure shown in FIG. 10.

Next, in step 1003, the receiving node decrypts the encrypted data based on a decryption key generated based on a plurality of values for indicating a channel. According to one embodiment, the plurality of the values may be determined based on reference signals transmitted through a plurality of transmit beams from the transmitting node. According to one embodiment, the receiving node may receive the reference signals through a plurality of receive beams. The plurality of the values for indicating the channel each may be defined for a plurality of beam pairs determined by combinations of the multiple receive beams of the receiving node and the multiple transmit beams of the transmitting node. For example, the plurality of the values may be CIR, and expressed by <Equation 2>.

$$\begin{pmatrix} h_{BA}^{11} \\ \vdots \\ h_{BA}^{M,N} \end{pmatrix} \quad \text{Equation 2}$$

In <Equation 2>, BA denotes a channel from the transmitting node (e.g., the deviceB) to the receiving node (e.g., the deviceA), ij (e.g., 11, ..., MN, etc) denotes a beam pair including a combination of an i-th receive beam of the receiving node and a j-th transmit beam of the transmitting node, and $h_{AB}^{ij}$ denotes the CIR for the beam pair including the combination of the i-th receive beam of the receiving node and the j-th transmit beam of the transmitting node in the channel from the transmitting node to the receiving node.

The receiving node may generate the decryption key based on bit sequences generated by quantizing the plurality of the values as shown in <Equation 2>. According to one embodiment, the decryption key may be updated at reception intervals of the reference signal. According to another embodiment, the decryption key may be changed according to a predetermined rule based on the seed of the deviceA.

As described in reference to FIG. 9 and FIG. 10, the transmitting node may encrypt the data based on the encryption key, and the receiving node may decrypt the encrypted data based on the decryption key. Herein, $h_{AB}^{ij}$ of <Equation 1> may correspond to $h_{BA}^{ij}$ of <Equation 2>. This is because the channel from the deviceA to the deviceB and the channel from the deviceB to the deviceA have the channel reciprocity. For example, $h_{AB}^{ij}$ and $h_{BA}^{ij}$ may have a relationship as shown in <Equation 3>.

$$\begin{pmatrix} h_{AB}^{11} \\ \vdots \\ h_{AB}^{N,M} \end{pmatrix} = \begin{pmatrix} h_{BA}^{11} \\ \vdots \\ h_{BA}^{M,N} \end{pmatrix} \quad \text{Equation 3}$$

In <Equation 3>, $h_{AB}^{ij}$ denotes the CIR for the beam pair including the combination of the i-th transmit beam of the deviceA and the j-th receive beam of the deviceB in the channel from the deviceA to the deviceB, and $h_{BA}^{ij}$ denotes the CIR for the beam pair including the combination of the i-th receive beam of the deviceA and the j-th transmit beam of the deviceB in the channel from the deviceB to the deviceA.

<Equation 3> indicates that the CIR of the channel from the deviceA to the deviceB and the CIR of the channel from the deviceB to the deviceA correspond to each other or are the same. Thus, since the encrypted data is encrypted using the encryption key generated based on the CIR (e.g., $h_{AB}^{ij}$) from the deviceA to the deviceB corresponding to the CIR (e.g., $h_{BA}^{ij}$) from the deviceB to the deviceA, the deviceA may successfully decrypt the encrypted data, even without receiving a separate public key from the deviceB which transmits the encrypted data.

As stated above, the device according to various embodiments of the present disclosure may generate the decryption key based on the plurality of the values for indicating the channel from the other device to the device. Specifically, the device, based on the decryption key, may decrypt the encrypted data based on the encryption key generated based on the CIR from the device to the other device having the channel reciprocity relationship with the CIR from the other device to the device. Thus, in the data transmission and reception procedure according to various embodiments, an operation for obtaining a separate secure key from the other device may be excluded. Since an operation for exchanging the secure key is not performed, the device may operate more robustly against the risk of hacking. In addition, since the device does not consume power for separate signaling to acquire the secure key, the power consumption caused by the signaling may be reduced.

Figure 11A:
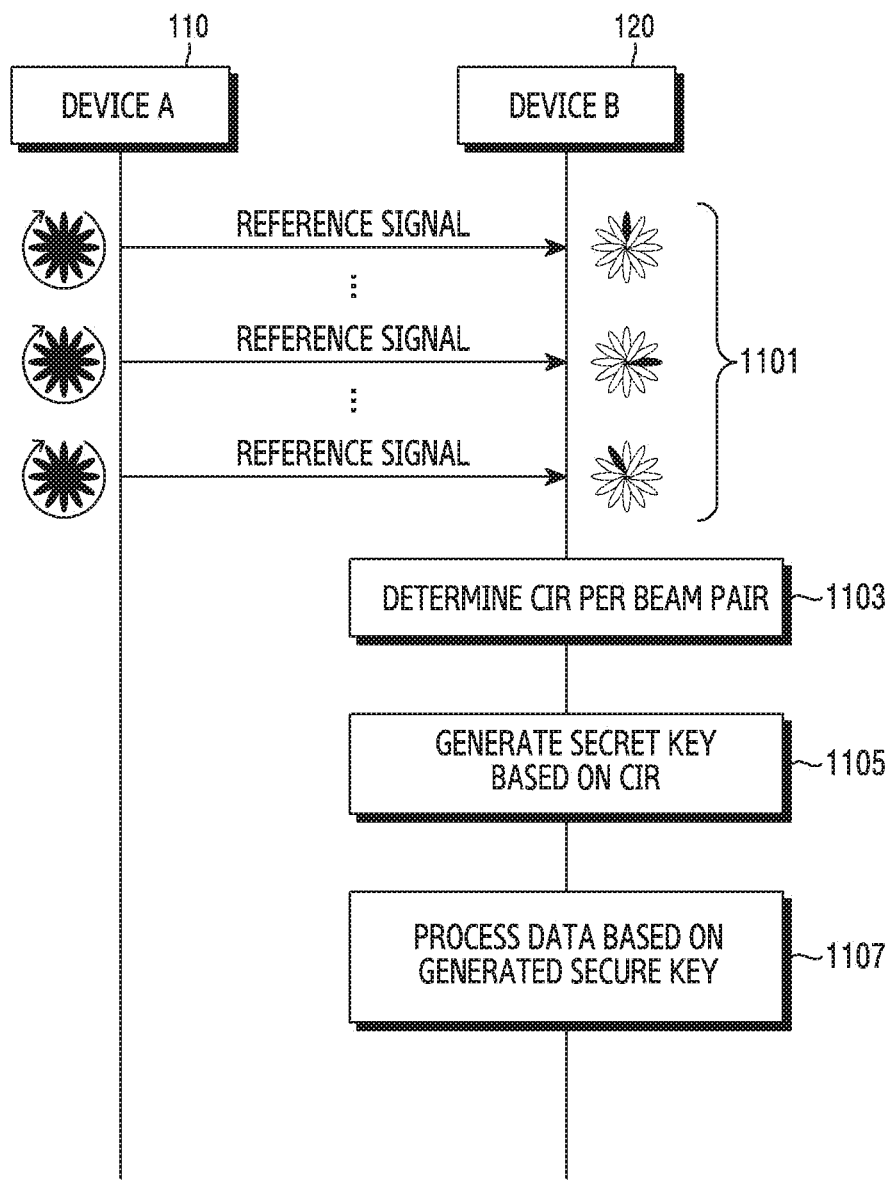
FIG. 11A illustrates signal exchanges for performing communications using a secure key based on a channel impulse response in a wireless communication system according to various embodiments of the present disclosure.

FIG. 11A illustrates signal exchanges for performing communications using a secure key based on a CIR in a wireless communication system according to various embodiments of the present disclosure. FIG. 11A illustrates a situation in which the deviceB 120 generates a secure key, that is, an encryption key or a decryption key, as the signal exchanges between the device A 110 and the deviceB 120.

Referring to FIG. 11A, in step 1101, the device A 110 transmits reference signals through beam sweeping of a plurality of transmit beams of the deviceA 110. Accordingly, the deviceB 120 receives the reference signals through beam sweeping of a plurality of receive beams of the deviceB 120. In so doing, the deviceB 120 may perform measurement on a plurality of beam pairs including combinations of the plurality of the transmit beams of the device A 110 and the plurality of the receive beams of the deviceB 120.

In step 1103, the deviceB 120 determines the CIR per beam pair. The reference signal transmitted and received over one beam pair may be received in a plurality of components through the multi-path. Thus, for each beam pair, the deviceB 120 may determine the CIR by estimating the TOA per component of the reference signal, estimating a magnitude of each component.

Figure 11B:
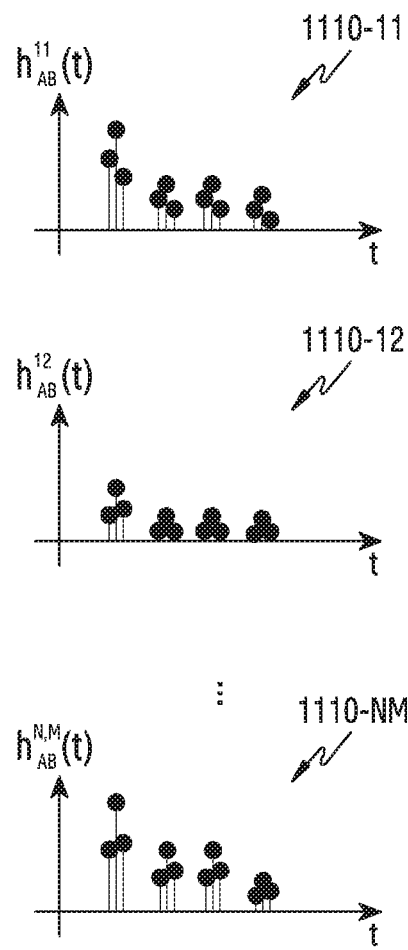
FIG. 11B illustrates an example of estimation results of a channel impulse response in a wireless communication system according to various embodiments of the present disclosure.

Hence, the CIR per beam pair may be determined as shown in FIG. 11B. Referring to FIG. 11B, in CIRs 1110-11 through 1110-NM, a horizontal axis indicates a difference between a reference time and a reception time of the reference signal, and a vertical axis indicates the magnitude of the measured value. As is shown in FIG. 11B, the CIRs 1110-11 through 1110-NM for the plurality of the beam pairs include measurement values having different magnitudes and reception times.

In step 1105, the deviceB 120 generates a secret key based on the determined CIR. The deviceB 120 may generate at least one sequence based on information indicating the CIRs 1110-11 through 1110-NM, and generate the secure key based on at least one sequence. For example, the deviceB 120 may generate a new secure key using at least one sequence, or modify a secure key generated by a different algorithm. Herein, the information indicating the CIRs may include at least part of the value indicating the CIR, or at least one of values indicating the beam pair corresponding to the CIR. In the information indicating the CIRs, each beam pair may be indicated with an index of a resource carrying the reference signal.

In step 1107, the deviceB 120 processes data based on the generated secure key. That is, the deviceB 120 may encrypt transmit data using the secret key, or decrypt encrypted received data using the secret key.

Figure 12A:
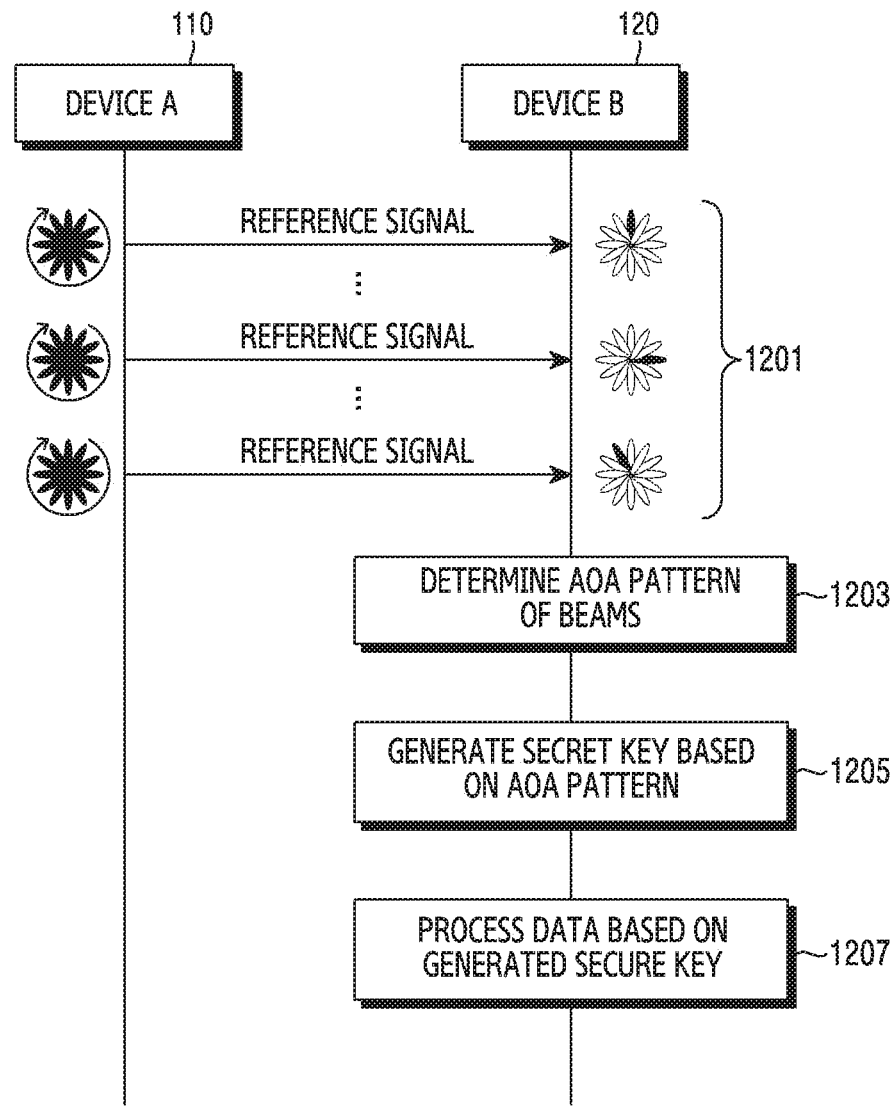
FIG. 12A illustrates signal exchanges for performing communications using a secure key based on an angle of arrival pattern in a wireless communication system according to various embodiments of the present disclosure.

FIG. 12A illustrates signal exchanges for performing communications using a secure key based on an AOA pattern in a wireless communication system according to various embodiments of the present disclosure. FIG. 12A illustrates a situation in which the deviceB 120 generates a secure key, that is, an encryption key or a decryption key, as the signal exchanges between the device A 120 and the deviceB 120.

Referring to FIG. 12A, in step 1201, the device A 110 transmits reference signals through beam sweeping of a plurality of transmit beams. Accordingly, the deviceB 120 receives the reference signals through beam sweeping of a plurality of receive beams of the deviceB 120. In so doing, the deviceB 120 may perform measurement on a plurality of beam pairs including combinations of the plurality of the transmit beams of the device A 110 and the plurality of the receive beams of the deviceB 120.

In step 1203, the deviceB 120 determines an AOA pattern of the beams. Herein, the AOA pattern may be determined by measuring the AOA of each transmit beam of the deviceA 110. That is, the deviceB 120 estimates AOAs for the reference signals transmitted from the deviceA 110. To estimate the AOA, the deviceB 120 may utilize measurement values of the receive beams with respect to one transmit beam. According to one embodiment, the deviceB 120 may estimate the AOA of the transmit beam based on a direction of the receive beam which provides the greatest signal gain for the transmit beam. For example, the direction of the receive beam which provides the greatest signal gain may be estimated as the AOA. According to another embodiment, the deviceB 120 may estimate the AOA of the transmit beam based on a pattern of measured signal strength values of the receive beams for the transmit beam. For example, the deviceB 120 may estimate the AOA, by identifying the AOA corresponding to the most similar pattern to the signal strength pattern measured in a maximum likelihood (ML) scheme, in mapping information between a predefined signal strength pattern and the AOA.

Figure 12B:
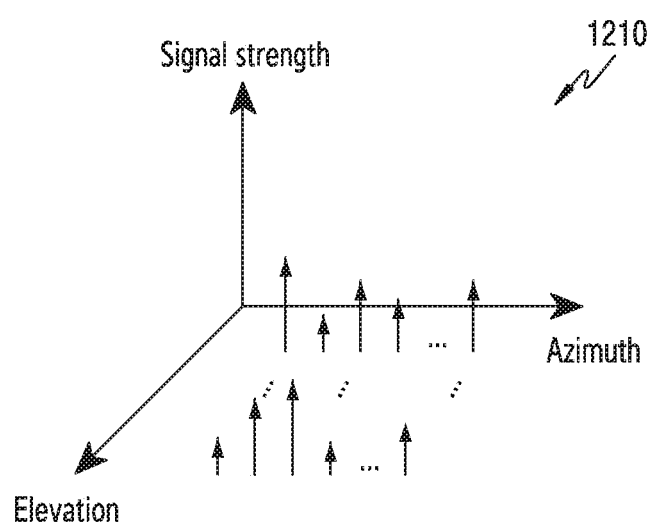
FIG. 12B illustrates an example of estimation results of an angle of arrival pattern in a wireless communication system according to various embodiments of the present disclosure.

Thus, as an example, an AOA pattern 120 as shown in FIG. 12B may be determined. Referring to FIG. 12B, a first axis indicates an elevation angle, that is, the angle of the horizontal plane and the beam, a second axis indicates an azimuth angle, that is, the angle of the vertical plane and the beam, and a third axis indicates the magnitude of the measurement value of the signal incident at a corresponding angle. According to another embodiment, the AOA pattern may be determined in a different form from FIG. 12B. For example, the AOA pattern may be defined as a set of the angle values per reference signal, without the magnitude of the measurement value.

In step 1205, the deviceB 120 generates a secret key based on the determined AOA pattern. The deviceB 120 may generate at least one sequence based on information indicating the AOA pattern, and generate the secure key based on at least one sequence. For example, the deviceB 120 may generate a new secure key using at least one sequence, or modify a secure key generated by a different algorithm. Herein, the information indicating the AOA pattern may include at least one of values indicating the AOA, and values indicating a beam corresponding to the AOA. In the information indicating the AOA pattern, each beam may be indicated with an index of a resource carrying the reference signal. In step 1207, the deviceB 120 processes the data based on the generated secure key. That is, the deviceB 120 may encrypt transmit data using the secret key, or decrypt encrypted received data using the secret key.

Figure 13:
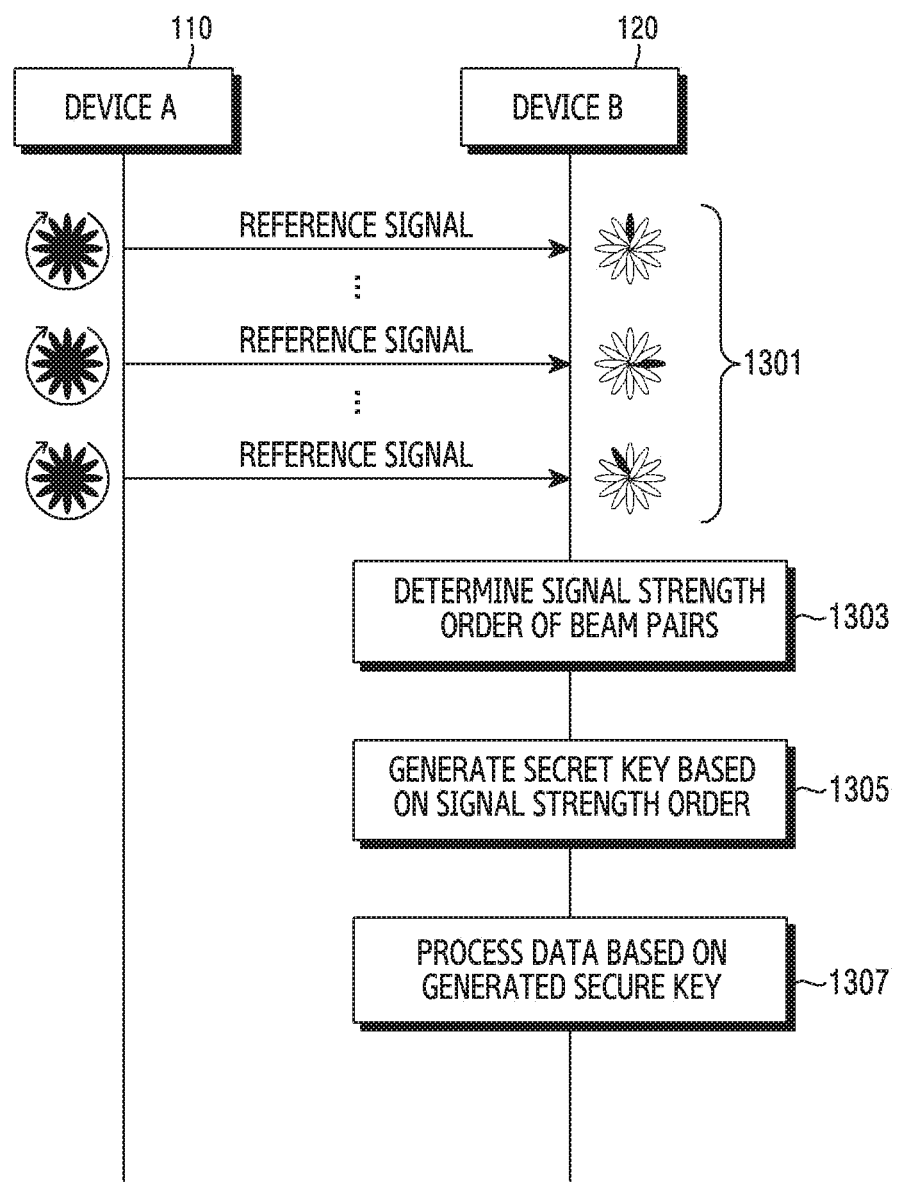
FIG. 13 illustrates signal exchanges for performing communications using a secure key based on a signal strength order in a wireless communication system according to various embodiments of the present disclosure.

FIG. 13 illustrates signal exchanges for performing communications using a secure key based on a signal strength order in a wireless communication system according to various embodiments of the present disclosure. FIG. 13 illustrates a situation in which the deviceB 120 generates a secure key, that is, an encryption key or a decryption key, as the signal exchanges between the device A 120 and the deviceB 120.

Referring to FIG. 13, in step 1301, the device A 110 transmits reference signals through beam sweeping of a plurality of transmit beams of the deviceA 110. Accordingly, the deviceB 120 receives the reference signals through beam sweeping of a plurality of receive beams of the deviceB 120. In so doing, the deviceB 120 may perform measurement on a plurality of beam pairs including combinations of the plurality of the transmit beams of the device A 110 and the plurality of the receive beams of the deviceB 120.

In step 1303, the deviceB 120 determines a signal strength order of the beam pairs. The combinations of the transmit beams and the receive beams include a plurality of beam pairs, and a beamforming gain provided by each beam pair may differ depending on a relative positional relationship and a channel environment of the device A 110 and the deviceB 120. Thus, according to the beam pair used to transmit and receive the reference signal, the signal strength measured on the reference signal may differ.

In step 1305, the deviceB 120 generates a secret key based on the determined signal strength order. The deviceB 120 may generate at least one sequence from the information indicating the signal strength order, and generate the secure key based on at least one sequence. For example, the deviceB 120 may generate a new secure key using at least one sequence, or modify a secure key generated by a different algorithm. Herein, the information indicating the signal strength order may include at least one of values indicating the beam pairs, and values indicating the signal strength. In the information indicating the signal strength order, each beam pair may be indicated with an index of a resource carrying the reference signal.

In step 1307, the deviceB 120 processes data based on the generated secure key. That is, the deviceB 120 may encrypt transmit data using the secret key, or decrypt the encrypted received data using the secret key.

Referring to FIG. 11A to FIG. 13, specific embodiments of generating the secure key using the channel related information have been described. However, according to various embodiments, information other than the above-described embodiments may be used to generate the secret key. Further, two or more information suggested in the above-stated embodiments may be used together to generate the secret key.

According to one embodiment, the secure key may be determined based on information of at least one beam pair which satisfies a particular condition. For example, information indicating the beam pair which provides the maximum receive strength, information indicating the beam pair which provides an n-th receive strength, or information indicating beam pairs which provide the receive strength over a threshold may be used to generate the secure key.

According to another embodiment, the secure key may be determined based on a difference of the reception order of the beam pairs which satisfy a particular condition. For example, the difference of the reception order of the beam pairs which provide the receive strength over the threshold (e.g., m-n, if the beam pair used in the n-th resource and the beam pair used in the m-th resource provide the receive strength over the threshold) may be used to generate the key.

The methods according to the embodiments described in the claims or the specification of the present disclosure may be implemented in hardware, software, or a combination of hardware and software.

For the software implementation, a computer-readable storage medium which stores one or more programs (software modules) may be provided. One or more programs stored in the computer-readable storage medium may be configured for execution by one or more processors of a device. One or more programs may include instructions for enabling the device to execute the methods according to the embodiments disclosed in the claims or the specification of the present disclosure.

Such a program (software module, software) may be stored to a random access memory, a non-volatile memory including a flash memory, a read only memory (ROM), an electrically erasable ROM (EEPROM), a magnetic disc storage device, a compact disc (CD)-ROM, digital versatile discs (DVDs) or other optical storage devices, and a magnetic cassette. Alternatively, the programs may be stored to a memory combining part or all of them. Also, a plurality of memories may be included.

Also, the programs may be stored in an attachable storage device accessible via a communication network such as Internet, Intranet, local area network (LAN), wide LAN (WLAN), or storage area network (SAN), or a communication network by combining these networks. Such a storage device may access an apparatus which realizes an embodiment of the present disclosure through an external port. Also, a separate storage device on the communication network may access the apparatus which realizes an embodiment of the present disclosure.

In the specific embodiments of the present disclosure as described above, the elements included in the disclosure are expressed in a singular or plural form. However, the singular or plural expression is appropriately selected according to a proposed situation for the convenience of explanations, the present disclosure is not limited to a single element or a plurality of elements, the elements expressed in the plural form may be configured as a single element, and the elements expressed in the singular form may be configured as a plurality of elements.

Meanwhile, the detailed description of the present disclosure has been described with reference to certain embodiments thereof, but various modifications may be made without departing from the scope of this disclosure. Therefore, the scope of this disclosure should not be limited to the described embodiments but should be defined by the claims as below and their equivalents within the scope of the claims.

The invention claimed is:

1. A method performed by a second device in a wireless communication system, the method comprising:
receiving, from a first device, data encrypted using a previous encryption key generated based on a previous sweeping order, of the second device, associated with a previous measurement result for a plurality of previous reference signals of the first device:
determining a sweeping order of a plurality of receive beams, of the second device, for a beam sweeping, wherein the sweeping order of the plurality of receive beams of the second device is different from the previous sweeping order of the second device;
performing the beam sweeping of the plurality of receive beams by using the sweeping order of the plurality of receive beams of the second device;
receiving, from the first device, a plurality of reference signals of the first device based on a plurality of transmission beams of the first device and the beam sweeping of the plurality of receive beams of the second device;
generating a decryption key based on a first measurement result, the sweeping order of the plurality of receive beams of the second device, and a resource difference between a first resource of a first reference signal of the first device and a second resource of a second reference signal of the first device, the first measurement result including first information indicating at least one reference signal of the first device among the plurality of reference signals of the first device and second information indicating the sweeping order of the plurality of receive beams of the second device;
transmitting, to the first device, a plurality of reference signals of the second device based on a sweeping order of a plurality of transmission beams of the second device, the sweeping order of the plurality of transmission beams of the second device corresponding to the sweeping order of the plurality of receive beams of the second device; and
receiving, from the first device, data encrypted using an encryption key generated based on the plurality of reference signals of the second device, a sweeping order of a plurality of receive beams of the first device, and a resource difference between a first resource of a first reference signal of the second device and a second resource of a second reference signal of the second device, the encryption key corresponding to the decryption key,
wherein each of the at least one reference signal of the first device and the at least one reference signal of the second device provide a signal strength greater than a threshold,
wherein the first reference signal of the first device is one of the at least one reference signal of the first device and the second reference signal of the first device, different from the first reference signal of the first device, is one of the at least one reference signal of the first device, and
wherein the first reference signal of the second device is one of the at least one reference signal of the second device and the second reference signal of the second device, different from the first reference signal of the second device, is one of the at least one reference signal of the second device.

2. The method of claim 1, further comprising:
obtaining channel information between each of the plurality of transmission beams of the first device and each of the plurality of receive beams of the second device based on the first measurement result,
wherein the encryption key is generated based on the channel information.

3. The method of claim 1, wherein the encryption key is updated according to a beam measurement interval.

4. An apparatus for a second device in a wireless communication system, comprising:
a transceiver; and
at least one processor coupled with the transceiver, wherein the at least one processor is configured to:
receive, from a first device, data encrypted using a previous encryption key generated based on a previous sweeping order, of the second device, associated with a previous measurement result for a plurality of previous reference signals of the first device,
determine a sweeping order of a plurality of receive beams, of the second device, for a beam sweeping, wherein the sweeping order of the plurality of receive beams of the second device is different from the previous sweeping order of the second device,
perform the beam sweeping of the plurality of receive beams by using the sweeping order of the plurality of receive beams of the second device,
receive, from the first device, a plurality of reference signals of the first device based on a plurality of transmission beams of the first device and the beam sweeping of the plurality of receive beams of the second device,
generate a decryption key based on a first measurement result, the sweeping order of the plurality of receive beams of the second device, and a resource difference between a first resource of a first reference signal of the first device and a second resource of a second reference signal of the first device, the first measurement result including first information indicating at least one reference signal of the first device among the plurality of reference signals of the first device and second information indicating the sweeping order of the plurality of receive beams of the second device,
transmit, to the first device, a plurality of reference signals of the second device based on a sweeping order of a plurality of transmission beams of the second device, the sweeping order of the plurality of transmission beams of the second device corresponding to the sweeping order of the plurality of receive beams of the second device, and
receive, from the first device, data encrypted using an encryption key generated based on the plurality of reference signals of the second device, a sweeping order of a plurality of receive beams of the first device, and a resource difference between a first resource of a first reference signal of the second device and a second resource of a second reference signal of the second device, the encryption key corresponding to the decryption key,
wherein each of the at least one reference signal of the first device and the at least one reference signal of the second device provides a signal strength greater than a threshold,
wherein the first reference signal of the first device is one of the at least one reference signal of the first device and the second reference signal of the first device, different from the first reference signal of the first device, is one of the at least one reference signal of the first device, and wherein the first reference signal of the second device is one of the at least one reference signal of the second device and the second reference signal of the second device, different from the first reference signal of the second device, is one of the at least one reference signal of the second device.

5. The apparatus of claim 4, wherein the at least one processor is further configured to:
obtain channel information between each of the plurality of transmission beams of the first device and each of the plurality of receive beams of the second device based on the first measurement result,
wherein the encryption key is generated based on the channel information.

6. The apparatus of claim 4, wherein the encryption key is updated according to a beam measurement interval.

* * * * *